United States Patent

[11] 3,626,304

[72] Inventor Gary A. Wallen
  Belmont, Mich.
[21] Appl. No. 5,470
[22] Filed Jan. 26, 1970
[45] Patented Dec. 7, 1971
[73] Assignee Lear Siegler, Inc.
  Grand Rapids, Mich.

[54] LINEAR DC TO AC CONVERTER
  15 Claims, 1 Drawing Fig.
[52] U.S. Cl. .................................................. 328/27,
  307/251, 321/49, 328/133, 330/10
[51] Int. Cl. ............................................................ H03k 5/08
[50] Field of Search .................................................... 328/27,
  133; 321/43–45, 10, 18, 49; 330/10; 332/37, 38;
  307/251

[56] References Cited
  UNITED STATES PATENTS
3,378,779 4/1968 Priddy ........................... 332/37
3,436,643 4/1969 Castiglione ................... 321/44
3,483,476 12/1969 Kobayashi ..................... 330/10
3,518,564 6/1970 Games ........................... 330/10

Primary Examiner—Donald D. Forrer
Assistant Examiner—David M. Carter
Attorneys—Wilfred O. Schmidt and Robert J. Carrier ABSTRACT: A DC to AC converter network in which a control signal produced by summing input DC with a network DC feedback signal, the control signal then being integrated and used to control the gate of a field effect transistor to operate the same as a variable resistance. A phase-splitter circuit provides out-of-phase AC components from an AC reference signal, and one of the components so produced is coupled to the other through the field effect transistor, to produce a resultant AC output whose phase and amplitude differ from the reference AC signal as a function of the integrated DC control signal. The resultant AC signal is fed to an amplifier and summed at the input thereof with a feedback signal from the amplifier output, and the latter is further amplified and fed to a phase-sensitive demodulator, to which the AC reference signal is also coupled. The demodulator output comprises the network feedback signal which is summed with the input DC, such that the amplified resultant AC signal is tied to the network input and will linearly follow the DC input signal.

PATENTED DEC 7 1971
3,626,304
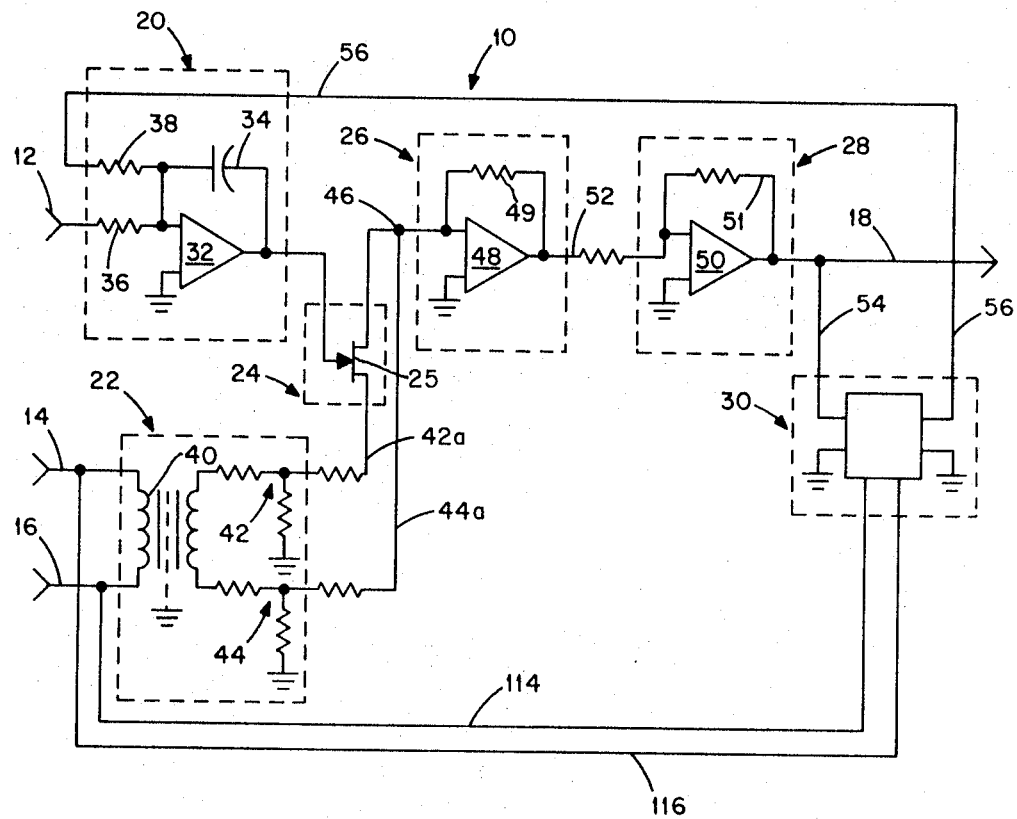
INVENTOR.
GARY A. WALLEN
BY *JPSchmidt*
ATTORNEY

LINEAR DC TO AC CONVERTER

BACKGROUND OF THE INVENTION

DC to AC converters or inverters as they are often called, are in general known at the present time, at least as a functionally classified general type of electronic device or circuit species. As of the present time, however, the state of the art has experienced considerable development over earlier vibrator, chopper, and multivibrator-type circuits, and a number of relatively advanced types of converter circuits have been developed, both as a result of rapidly expanding electronic technology in general and as a result of a number of relatively well-defined and pronounced needs for converters satisfying particular requirements. For example, U.S. Pat. Nos. 2,926,296, 3,176,213 and 3,317,758, granted during the 1960–1970 period, all disclose different types of converters (or inverters) having particular characteristics and satisfying particular requirements which were peculiar to the situation facing each of the patentees at the time.

Notwithstanding both the generalized and the particularized advances in the art referred to hereinabove, there nonetheless remains at the present time a significant and pronounced need for a DC to AC converter which will faithfully and accurately provide an AC output which is linearly related to a DC input, particularly for applications where such input is expected to very, or is variable. In particular, there is a pronounced need for such a converter which is essentially purely electronic, and which has minimum space and weight requirements, low manufacturing costs, and good operational stability.

SUMMARY OF THE INVENTION

It is a major objective of the present invention to provide a new and unique type of DC to AC converter wherein excellent linearity exists between the AC output and the DC input.

It is a further objective of the invention to provide a converter circuit of the aforementioned nature, which is comprised substantially entirely of solid state components, and which is compact and light in weight for the performance which it provides.

A further objective of the invention is to provide a converter of the aforementioned nature having a unique compensating and equalizing feedback arrangement for assuring desired output linearity, including phase and polarity sensitivities.

Further important objectives of the invention include the provision, in a converter of the aforementioned nature, of a compensated input used to control a field effect transistor to provide phase and amplitude-controlled amplified AC converter output signals.

The foregoing objects and advantages of the invention, together with other desirable objects and advantages thereof, will become more apparent from the following specification and the attached drawings, illustrating a preferred embodiment of the invention.

BRIEF DESCRIPTION OF THE DRAWINGS

The single FIGURE in the drawings is a schematic block diagram of the converter circuit.

DESCRIPTION OF THE PREFERRED EMBODIMENT

The converter circuit 10 of the invention includes a DC input terminal 12, particularly for variable DC inputs, input terminals 14 and 16 for reference AC voltage, and an output terminal 18 from which the linear, converted AC output is obtainable. Between the input and output terminals, the circuit 10 generally includes an integrating network 20 which is coupled to the DC input 12, a phase-splitter circuit 22 coupled to the AC reference voltage inputs 14 and 16, a voltage-controlled resistance means 24, a pair of amplifying stages 26 and 28, and a phase-sensitive demodulator network 30. Most commonly, the AC input will have the conventional sinusoidal wave function.

More particularly, the aforementioned integrating network 20 includes an integrating amplifier, comprised of a DC amplifier 32 having a capacitive feedback loop 34, together with an input resistor 36 and a network feedback resistor 38, interconnected such that the DC input from terminal 12 and the network feedback through resistor 38 are summed at the input to amplifier 32, at which point the amplifier feedback loop 34 is also connected. Thus, the effective input to amplifier 32 is composite one, resulting from the interaction of three factors.

The phase-splitter circuit 22 includes transformer 40, whose primary is connected to the reference AC inputs 14 and 16, and whose secondary is connected through resistive "T" networks 42 and 44 and corresponding conductors 42a and 44a to opposite sides (i.e., source and drain electrodes) of a field effect transistor 25 which comprises the aforementioned voltage-controlled resistance means 24. The gate of this field effect transistor is connected to the output of the integrating network 20.

The junction of conductor 44a from the phase-splitter circuit 22 and the side of the field effect transistor 25 to which conductor 44a connects, designated as circuit point 46 in the drawing, is connected to the input of amplifier stage 26, and the output of this amplifier is in turn coupled to the input of amplifier stage 28. These amplifier stages may comprise DC operational amplifiers 48 and 50, respectively, each having resistive feedback loops 49 and 51, respectively. As illustrated, the amplifier stages are coupled by a conductive path 52, which may include a coupling resistor 52a.

A portion of the output from the second amplifier stage 28 is coupled, by a conductor 54, to the phase-sensitive demodulator 30, which also receives AC reference voltage from reference input terminals 14 and 16, through conductors 114 and 116, respectively. The demodulated output from demodulator 30, appearing on conductor 56, constitutes the aforementioned network feedback, being fed back to the input of the converter, through feedback resistor 38, to the input of the integrator amplifier 32.

In operation, the converter circuit 10 of the invention first sums the variable DC input from terminal 12 with the network feedback appearing on conductor 56 and resistor 38, which operates to equalize the feedback signal with the DC input. The resulting signal provides the input to the integrating amplifier 32, which is feedback-compensated through its capacitive feedback loop 34. The output from the integrator 20 provides a DC control signal for the field effect transistor 25, which functions as a voltage-controlled variable resistance. The phase-splitter network 22 operates to provide a pair of AC signal components, preferably sinusoidal in nature, of equal amplitude but opposite phase characteristics, and these are applied to the field effect transistor, which varies the signal component passing through it (i.e., the signal on conductor 42a) so that the same is summed at point 46 with the signal component on conductor 44a as a function of the control signal from the integrator circuit.

The AC signal at circuit point 46 from the field effect transistor 25 and conductor 44a is summed at the input of amplifier 48 with the feedback signal on loop 49, and the amplifier output is fed to amplifier stage 28 and appears as the circuit output on output terminal 18. However, the output from terminal 18 is also applied to the demodulator 30, to which the reference AC input voltage is also applied, and the output signal from the demodulator is a DC signal whose amplitude will vary linearly with the amplitude of the input signal to the demodulator, while the polarity of the demodulator output will vary directly as a function of the phase relationships between the reference AC signals and the AC output from amplifier stage 28. Since the demodulator output is fed back to the circuit input and summed with the variable DC input, the actual AC output, i.e., equalization of the network feedback signal with the DC input causes the AC signal coupled to the demodulator and comprising the converter output to linearly follow the level of the DC input signal. When the conventional sine wave AC signal is applied at the AC input terminals 14 and 16, as preferred, then the DC signal characteristics are impressed on the AC sine wave signal so that the output signal appearing at the output terminal 18 will be a sine wave AC signal which is linearly related to the DC input signal. Thus, the AC output signal will have the wave characteristics of the AC reference signal.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows.

1. A linear DC-to-AC converter comprising in combination: a DC input means, including a DC input terminal and means for summing a DC input signal therefrom and a feedback signal; an AC reference input source, including circuitry for providing AC signal components of opposite phase characteristics; circuit means coupled to said DC input means and to said reference signal circuitry for varying the AC signal in accordance with said summed DC input and feedback signals so that said AC signal has phase and amplitude characteristics related to said DC input and feedback signals; a phase-sensitive demodulator means coupled to receive both said resultant AC signal and said AC reference input and to produce therefrom a DC feedback signal whose amplitude and polarity are functions of the amplitude and phase relationships of said resultant signal and reference input; and a circuit path coupling said feedback signal to said DC input means, whereby said resultant signal varies linearly with said DC input signal, comprises an output for the converter and has wave characteristics of said AC signal components.

2. The DC-to-AC converter of claim 1, wherein said DC input means includes means for integrating said summed input and feedback signals.

3. The DC-to-AC converter of claim 1, wherein said circuit means for effectively combining said AC signal components includes variable resistance means coupled to said AC signal component circuitry to receive at least one of said AC signal components.

4. The DC-to-AC converter of claim 3, wherein said variable resistance means further has a control terminal, and the latter is coupled to said DC input means.

5. The DC-to-AC converter of claim 4, wherein said variable resistance means comprises a field-effect transistor having a gate electrode comprising said control terminal and connected to said DC input means.

6. The DC-to-AC converter of claim 5, wherein said DC input means includes means for integrating said summed input and feedback signals, said integrating means coupled to said gate electrode.

7. The DC-to-AC converter of claim 1, wherein said AC signal component circuitry includes phase-splitter circuitry for splitting said AC reference input into a pair of out-of-phase signal components.

8. The AC-to-DC converter of claim 1, wherein said DC input means includes means for integrating said summed input and feedback signals; wherein said circuit means for effectively combining said AC signal components includes variable resistance means coupled to said AC signal component circuitry to receive at least one of said AC signal components; said variable resistance means further having a control terminal coupled to said integrating means to receive the summed and integrated input and feedback signals; and including amplifier means coupled between said variable resistance means and said demodulator means to amplify said resultant signal before the same is received by said demodulator means.

9. A method of linearly converting DC signals to AC signals, comprising the steps: using a DC control signal to produce an AC resultant signal by varying an AC reference signal in a manner such that the phase and amplitude of said resultant signal are functions of said control signal and whereby said resultant signal has wave characteristics of said AC reference signal; demodulating at least a portion of said resultant signal by use of said AC reference signal to produce a proportional DC feedback signal whose amplitude and polarity correspond to functions of the amplitude and phase relationships of both said resultant signal and said AC reference signal coupling said feedback signal back to an input point; and summing the feedback signal with a DC input signal at said input point to produce said control signal; said resultant signal thereby comprising a converted AC output which is linearly related to said DC input signal and which has wave characteristics of said AC reference signal.

10. The method of claim 9, including the step of integrating said summed input and feedback signals to produce the said control signal.

11. The method of claim 9, wherein said control signal is used to produce said resultant signal by applying the former to the gate electrode of a field effect transistor.

12. The method of claim 11, wherein said AC resultant signal is produced by applying out-of-phase signal components to the source and drain electrodes of said field effect transistor, while said control signal is used to energize the gate electrode thereof.

13. A converter for producing a sinusoidal AC signal from a DC input signal, said converter comprising:
   a DC input means for receiving a DC input signal;
   an AC reference input source including means for producing a sinusoidal AC signal;
   circuit means coupled to said DC input means and said AC reference input source, said circuit means including means for varying the amplitude of said sinusoidal AC signal in accordance with said DC input signal to produce a sinusoidal AC output signal whose phase and amplitude are a function of said DC input signal; and
   an AC output means coupled to said circuit means for obtaining a sinusoidal AC output signal.

14. A converter according to claim 13 and further comprising means for demodulating a portion of said AC output signal, means for feeding back said demodulated output signal, and means for summing said demodulated feedback signal with said DC input signal.

15 A converter according to claim 13 wherein said circuit means includes a field effect transistor having a gate coupled to said DC input means.

* * * * *